Patented Dec. 4, 1928.

1,693,907

UNITED STATES PATENT OFFICE.

EMIL LÜSCHER, OF BASEL, SWITZERLAND, ASSIGNOR TO THE COMPANY ELEKTRIZITATSWERK LONZA, OF GAMPEL AND BASEL, SWITZERLAND.

MANUFACTURE OF CROTONALDEHYDE FROM ACETALDEHYDE AND ALDOL.

No Drawing. Application filed April 25, 1927, Serial No. 186,591, and in Switzerland May 4, 1926.

In the technical manufacture of crotonaldehyde there was hitherto used aldol which in its turn was obtained by treating acetaldehyde with alkaline reacting substances. The output in this manufacture was not quite what one could wish, as in the aldolizing operation as well as in the distillation greatly disturbing secondary reactions are produced. In the processes hitherto disclosed for the preparation of aldol, reaction mixtures were formed, which according to the nature of the used condensating agents required a separation of the pure aldol from the solid salts or aqueous solutions, an operation which was somewhat expensive owing to the great viscosity of the aldol and higher resin like condensation products. If the crude aldol thus obtained is not purified, it is not adapted for the direct preparation of crotonaldehyde for the reason that the salts which are present in solid or dissolved form have a disturbing action on the distillation inasmuch as they cause the formation of a resinous product, thus diminishing considerably the output by losses which may attain 15 to 20 per cent and more.

Now, it has been found that in the manufacture of crotonaldehyde from acetaldehyde and aldol these drawbacks can be avoided if acetaldehyde is combined in an atmosphere of nitrogen with only such a quantity of a diluted aqueous solution of a caustic alkali that subsequent neutralization of the product of reaction by a mineral acid does not cause precipitation, and if after addition of a mineral acid the reaction mixture containing aldol, acetaldehyde and a little salt is fractionally distilled without previous purification or separation, within a circulating atmosphere of nitrogen.

The quantity of alkalihydroxide, which is used in the present case, is only about 1 to 2 hundredth per cent of the weight of acetaldehyde when in form of a diluted watery solution. The advantages of such a weak alkali concentration consist in that first an extremely pure aldol, that is one which contains only traces of higher condensation products is formed, that secondly no precipitation is produced on the neutralization with a mineral acid, such as for example sulfuric acid or phosphoric acid, and that thirdly this weak salt concentration does not affect unfavorably the distillation or the transformation of the aldol to crotonaldehyde.

When the distillation is conducted in a continuous way, outputs of crotonaldehyde are obtained, which may be of 95 to 98 per cent of the theoretical value. If the operation takes place in this manner, the isolation of the aldol in pure state is not necessary.

If the solution of the alkalihydroxide is caused to run directly into great quantities of water-free acetaldehyde a great heating of the mass takes place at the beginning, which should be conveniently moderated by an outer cooling. If, however, the alkali solution is caused to run into a mixture of acetaldehyde and aldol, the reaction temperature can easily be maintained for example at 30 to 40° C., provided that acetaldehyde is continuously added simultaneously with the alkali.

The following example illustrates the improved process:

100 kg. of acetaldehyde are mixed in an atmosphere of nitrogen little by little with 200 cm.$^3$ of a 5 per cent solution of sodium hydroxide, whereby the temperature is allowed to rise slowly to about 30 to 35° C. After the addition of all of the alkali, the reaction mixture is still left for some time at this temperature. To the reaction mixture there is then added 1 kg. of phosphoric acid and a fractional distillation is performed in a circulating atmosphere of nitrogen.

Where operating in this manner, crotonaldehyde is obtained in a good output.

The operation is effected in an atmosphere of nitrogen for the reason that acetaldehyde, for example when being stirred, very easily absorbs oxygen which gives rise to the formation of acetic acid, whereby the condensation would be unfavorably affected.

In the manufacture of aldol from acetaldehyde there was hitherto employed alkaline condensing agents in quantities of 0,5% and more. The use of such considerable quantities of alkalis causes, however, on the neutralization of the alkali by a mineral acid a separation of salts which on the further treatment of the aldol have an interfering or resinating action.

Instead of phosphoric acid sulfuric acid or any other convenient mineral acid can be used.

What I claim is:

A process for the manufacture of crotonaldehyde from acetaldehyde and aldol, consisting in combining acetaldehyde in an atmosphere of nitrogen with only such a quantity of a diluted aqueous solution of a caustic alkali as to not cause any precipitation on subsequent neutralization, then adding a mineral acid to the reaction product to obtain a reaction mixture containing aldol, acetaldehyde and a little salt, and finally distilling fractionally this reaction mixture without previous purification or separation within a circulating atmosphere of nitrogen.

In witness whereof I have hereunto signed my name this 14th day of April, 1927.

EMIL LÜSCHER.